United States Patent [19]

Thalmann

[11] 4,362,684
[45] Dec. 7, 1982

[54] PROCESS AND APPARATUS FOR MAKING A WELDING SLEEVE

[75] Inventor: Alfred Thalmann, Uhwiesen, Switzerland

[73] Assignee: George Fischer Aktiengesellschaft, Switzerland

[21] Appl. No.: 248,543

[22] Filed: Mar. 27, 1981

[30] Foreign Application Priority Data

Mar. 31, 1980 [CH] Switzerland .......................... 2531/80

[51] Int. Cl.³ .................... B29C 27/00; H05B 3/58
[52] U.S. Cl. .................................. 264/230; 156/86; 156/304.2; 219/535; 219/544; 264/272.19; 264/294; 264/342 R; 425/393; 425/517
[58] Field of Search ............... 219/535, 544; 156/84, 156/86, 275, 272, 304.2, 304.6, 158, 502, 379.7, 293, 294; 264/322, 272.15, 272.11, 272.18, 229, 230, 294, 342 R; 285/292; 425/517, 111, 392, 393

[56] References Cited

U.S. PATENT DOCUMENTS 3,378,672 8/1975 Blumenkranz .
3,972,548 8/1976 Roseen ............................. 156/304.2
4,313,053 1/1982 Sturm ................................... 156/272

FOREIGN PATENT DOCUMENTS 2302458 of 1974 Fed. Rep. of Germany .
396536 of 1966 Switzerland .
457647 of 1968 Switzerland .
544906 of 1974 Switzerland .

OTHER PUBLICATIONS

WO7901018, PCT Sturm.

*Primary Examiner*—Michael W. Ball
*Attorney, Agent, or Firm*—Roylance, Abrams, Berdo & Farley

[57] ABSTRACT

A welding sleeve useable for connecting of pipes formed from thermoplastic material, is formed from a tubular body of thermoplastic material and a coil disposed on its inside surface. The coil has a resistance wire encased with thermoplastic material. The windings of the coil (4) are bonded into a compact coil which is inserted into the heated tubular body while it is simultaneously widened. As the result of a partial contraction of the tubular body also of the coil a firm connection develops between the oil and the body. Furthermore, the tubular body has a frozen-in, latent, radial contraction strain as a result of the widening, which during heating during the welding process, eliminates the radial play between coil and the pipes and produces a welding pressure.

11 Claims, 7 Drawing Figures

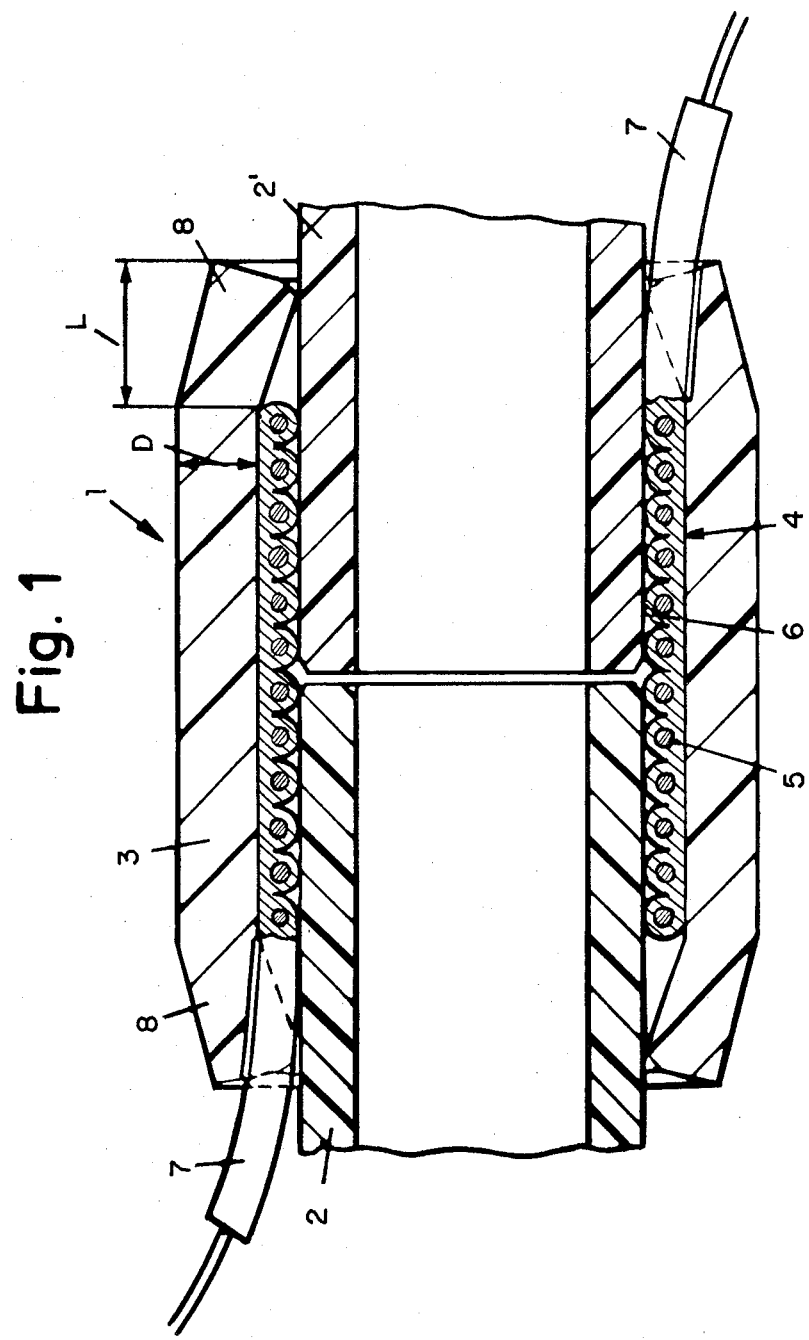

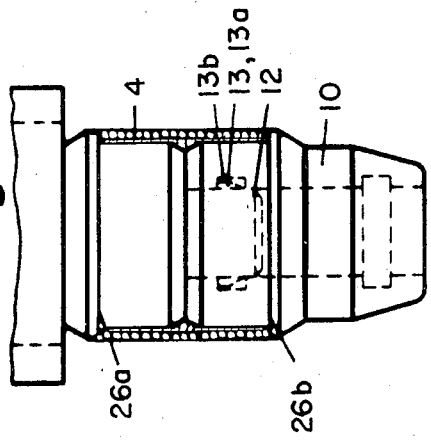
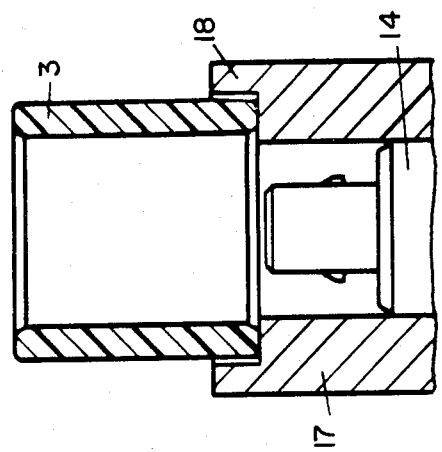
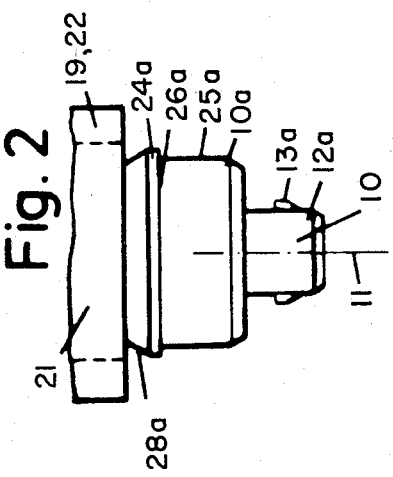
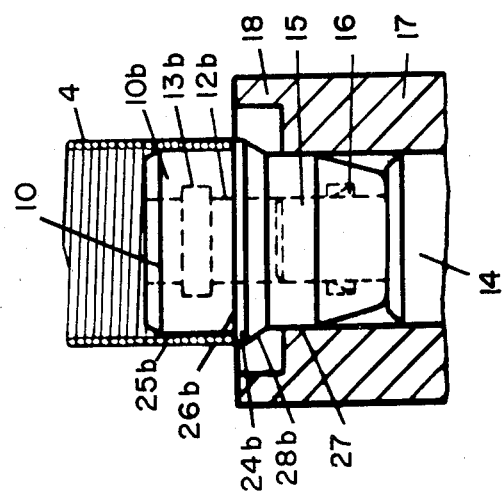

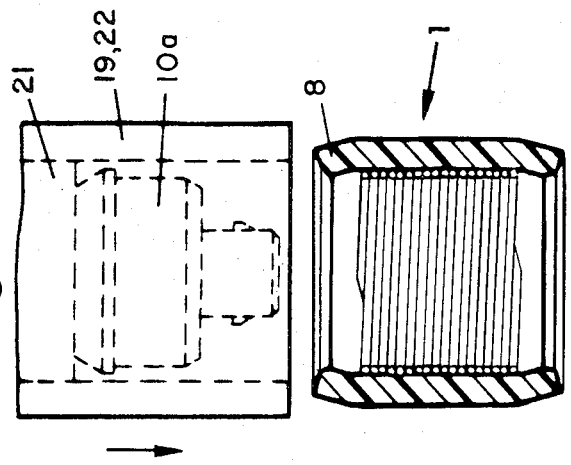
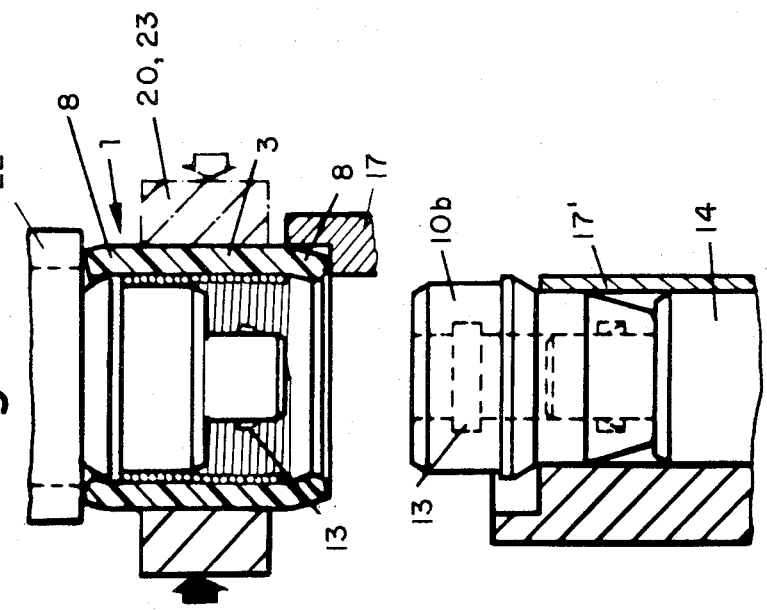

PROCESS AND APPARATUS FOR MAKING A WELDING SLEEVE

The invention relates to a welding sleeve for connecting two thermoplastic pipes and to the process and method of making the welding sleeve.

BACKGROUND OF THE INVENTION

A welding sleeve is disclosed in Swiss application No. 396 536 in which a coil is fixedly disposed within a tubular body by placing the coil within an injection mold for forming the body or extruding the body over the coil. Such welding sleeve is produced in a complicated manner and has a good safety factor as a result of the resistance wire being encased and partially coated to prevent short circuits and accidents during handling of the welding sleeve when charged with voltage without being plugged in conductive tube elements. However, the quality of the welding connection for commercially available pipes is insufficient.

The commercially available pipes are somewhat oval in cross section and have wide measurement tolerances for the outside diameter. In order to be able to slide such pipes without problems into the sleeve, the inside diameter of the coil and of the sleeve must be made correspondingly large. The contraction capacity of a tubular body which has been injection molded or extruded onto the coil is about 1.5%. In practice, this low contraction capacity and the required play between sleeve and pipe, particularly in case of a combination of extreme tolerances, develops insufficient welding pressure at the periphery resulting in a poor welding connection.

In order to be able to balance out such tolerances and to produce a sufficient welding pressure, it has been known to widen the tubular bodies by heat stretching. In that case radial contraction strains are frozen in the tubular body, which become free upon heating of the welding sleeve by means of the resistance wire, causing a shrinking of the welding sleeve.

Swiss Pat. No. 544 906 discloses a welding sleeve with an extruded annular body widened in such a manner. This welding sleeve is provided with a bare resistance wire which is inserted into a groove produced after widening of the body inside diameter by incision. However the built-in contraction strains are lost as a result of subsequent processing or they no longer become free in a controlled manner. This sleeve is also disadvantageous, since the bare resistance wire is unsafe and since the production of the welding sleeve by mechanical processing and the insertion of the resistance wire into the groove is very complicated and expensive.

Furthermore, German application No. 2,302,458 discloses a welding sleeve in which a bare heating wire is applied to core jacket segments disposed on a mandrel with the required spacing of windings. A widening device is inserted through the windings of the wire and into a pipe section heated on the outside wall. Then the inside wall is heated to about 180° C. by heating the mandrel to connect the bare heating wire with the pipe section. However, by this heating the contraction strains in the pipe section are liberated for the greatest part and are thus not available for the bridging of larger pipe tolerances during the production of the welding connection.

In the welding sleeve shown in application WO-A No. 79/01018, the resistance heating wire is covered up by a part of the material on the inside diameter of the piece of pipe. The production of electric heat in the resistance wire causes flowing of the material in its vicinity and penetration of the windings into the material. In this case too, the contraction strains existing in the piece of pipe, are freed, which leads to the described disadvantages.

BRIEF DESCRIPTION OF THE INVENTION

An object of the present invention is to provide a welding sleeve, and a process and apparatus for its production, which produces good welding connections between thermoplastic pipes even if the pipe tolerances are large, which is suitably protected against electrical contact, and which has a uniform quality as the result of a simple and reliable production operation. The apparatus of the invention should moreover, facilitate the automatic production of the welding sleeve.

Other objects, advantages and salient features of the present invention will become apparent from the following detailed description of a preferred embodiment of the invention.

Briefly described, the invention includes an improved welding sleeve for connecting two thermoplastic pipes comprising a helical coil and a tubular body of thermoplastic material. The helical coil has a resistance wire in a casing of thermoplastic material with adjacent windings thereof secured together and with the wire having ends extending outwardly from the coil for connection to a power source. The tubular body has the coil secured on its inside surface, frozen, latent, radial contraction strains and cone-shaped ends tapering toward end edges of the body. The coil is secured in the body by partially contracting the body about the coil. The cone-shaped ends form the smallest inside diameter of the body which is approximately equal to the inside diameter of the coil.

The invention also includes an improved process comprising the steps of forming a helical coil having a resistance wire in a casing of thermoplastic material with adjacent windings thereof secured together, mounting the coil in a mandrel; heating a tubular body of thermoplastic material and pushing the body onto the mandrel to widen and stretch the body over the coil while the body is at a temperature between about 20° C. and about 40° C. below the temperature of the crystallite melting region of the body thermoplastic material, partially cooling and contracting the body about the coil, and stripping the body off the mandrel with the coil secured on the inside surface thereof.

The invention further includes an improved apparatus for forming a tubular body of thermoplastic material with a helical coil of a resistance wire encased in thermoplastic material comprising a mandrel having means for receiving a coil thereon and having a conical widening surface, at least one pressure member disposed coaxially retative to the mandrel, and means for moving the pressure member in an axial direction toward and away from the mandrel.

This results in a compact welding sleeve, the windings of which are in close contact with the body of the sleeve and lie as close as possible against the outside diameter of the pipe to be bonded with good electrical contact protection permitting simple handling of the welding sleeve.

The frozen, radial contraction strains facilitate bonding of the pipes by bridging the play between the sleeve and pipes and producing welding pressure.

The simultaneous widening and sliding of the tubular body onto the coil create radial contraction strains in the tubular body, result in a good connection between the coil and the tubular body, and permit quick production of the welding sleeve without problems outside of the injection molding machine. This facilitates the preceding bonding of the windings of the coil.

BRIEF DESCRIPTION OF THE DRAWINGS

The apparatus of the invention forms an excellent widening of the tubular body with simultaneous sliding of the body over the coil. This facilitates automatic production of the welding sleeve of the invention.

In order that the manner in which the foregoing and other objects are attained in accordance with the invention can be understood in detail, a particularly advantageous embodiment thereof will be described with reference to the accompanying drawings, which form a part of this specification, and wherein:

FIG. 1 is a longitudinal section through a welding sleeve in accordance with the present invention for the connection of two pipes made of thermoplastic material; and FIGS. 2 to 7 illustrate show various precessing steps in the production of a welding sleeve and the apparatus required therefor in accordance with the present invention in a simplified form.

DETAILED DESCRIPTION OF THE PREFERRED EMBODIMENT OF THE INVENTION

Figure 5:
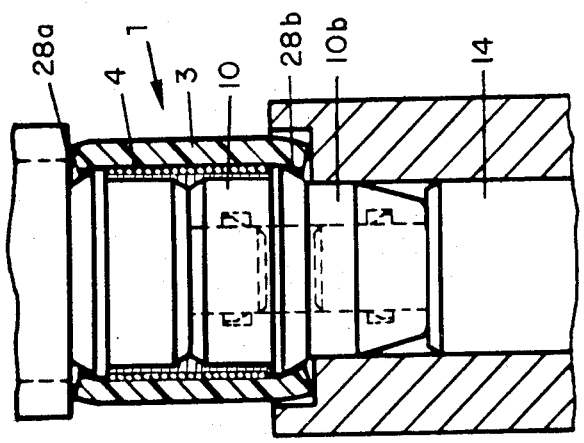

The welding sleeve 1 shown in FIG. 1 for connecting pipes 2 and 2' made of thermoplastic material, comprises an annular or tubular body 3 and a helical coil 4.

The coil 4 comprises a resistance wire 5 wound in a spiral shape and provided in a casing 6 of thermoplastic material. The casing can employ the same or a kindred thermoplastic material as used for the tubular body 3 and the pipes 2 and 2'. The casing 6 is preferably round in the cross section and wound such that the individual windings touch each other. During or after the winding, adjacent windings are interconnected firmly by welding, preferably on the outside periphery, as a result of which a compact coil 4 develops. The resistance wire is wound, preferably monofil, such that each end 7 of the wire is brought out for connection to a power source at the opposite ends of the annular body 3. As a result of the compact coil 4, a high specific heating performance will be achieved, which insures excellent welded connections.

With a bifilar coil, both ends of the wire may be disposed at one end of the welding sleeve.

The coil 4 is slipped into the heated, widened tubular body 3, so that a firm connection develops between the coil 4 and the tubular body 3. Preferably the widening of the tubular body takes place together with sliding in of the coil 4.

During widening, the tubular body 3 has a temperature which is about 20° to about 40° C. below the temperature of the crystallite melting region or range of the thermoplastic material thereof. The tubular body 3 is produced by a injection molding process or from pieces of pipe, produced partly or wholly mechanically, whereby contraction strains of variable direction are frozen in. By welding the diameter at the stated temperature, the contraction strains acting in a radial direction are considerably increased. Preferably, the tubular body is widened in the range of 3% to 12% of the measure of the inside diameter to ensure that it may be slipped exactly over the outside diameter of the coil.

The coil 4 is shorter than the tubular body 3, whereby the opposite ends 8 of tubular body 3 extend for equal lengths beyond the coil. The ends are cone-shaped and taper with a decreasing diameter toward the end edges of the body. The smallest inside diameter of the tubular body 3 is of equal size or slightly larger than the inside diameter of the coil 4 to form a guide part for facilitating sliding of the welding sleeve onto the pipe-shaped part 2, 2' that is to be bonded and to protect the winding wires at the same time against shifting and damage. After bonding, these ends produce an additional centering and support outside of the welding area.

The conical end construction develops as a result of the partial contraction process, whereby, in order to achieve the desired smallest inside diameter, the length L of the ends 8 should be at least 1.5 times the wall thickness D of the tubular body 3.

FIGS. 2 to 7 show the production of the welding sleeve 1 in various processing steps together with apparatus required for it.

As illustrated in FIGS. 2 and 3, the device includes a mandrel 10, which comprises two mandrel halves or portions 10a and 10b separated in a plane extending transversely to the longitudinal axis 11. The mandrel 10 is disposed preferably vertically along its longitudinal axis 11, with the upper half of the mandrel 10a is firmly connected with a mandrel holder 21. Naturally, horizontal or slanting arrangements of the mandrel are also possible.

Both halves 10a, 10b of the mandrel can be concentrically interconnected by means of a centering mechanism 12 and a locking arrangement 13. The centering mechanism 12 comprises a peg 12a disposed on the upper half 10a of the mandrel and a centering bore 12b disposed on the lower half of the mandrel. The locking arrangement 13 has radially moveable locking cams 13a disposed, for example, on the peg 12a, which engage in a groove 13b disposed in the lower half 10b of the mandrel. The lower half 10b of the mandrel can be connected to an axially moveable mandrel support 14, and to a similarly arranged centering mechanism 15 and locking arrangement 16. One or more axially shiftable pressure member or casing 17 or casings are been disposed coaxially to the mandrel support 14, which has a centering step 18.

Each half 10a, 10b of the mandrel has a shoulder 24a, 24b and a cylindrical part 25a, 25b for the reception of the coil 4, whereby the coil 4 is held axially by the opposed contact surfaces 26a, 26b of the two shoulders 24a, 24b. The outside diameter of the shoulder 24a, 24b is at least equal to or slightly larger than the outside diameter of the coil 4.

At the lower half 10b of the mandrel, an additional cylindrical part 27 has been disposed, the outside diameter of which is slightly smaller than the inside diameter of the prefabricated tubular body 3. A conical surface 28b is disposed between cylindrical part 27 and the shoulder 24b, which surface forms an expanding cone for the tubular body 3. A corresponding conical surface 28a is disposed upon the upper mandrel 10a between the shoulder 24a and the mandrel holder 21.

A stripper arrangement 19 and a holding arrangement 20 (see FIGS. 6 and 7) for the welding sleeve are disposed on the apparatus. The stripper arrangement 19 has an axially shiftable casing 22 disposed concentrically in relation to the mandrel holder 21 or to the upper half 10a of the mandrel. The holding arrangement 20 (FIG. 7) has at least two jaws 23, shiftable transversely to the longitudinal axis 11 of the mandrel 10.

The production of the welding sleeve 1 is accomplished according to the processing steps, described subsequently.

Figure 4:
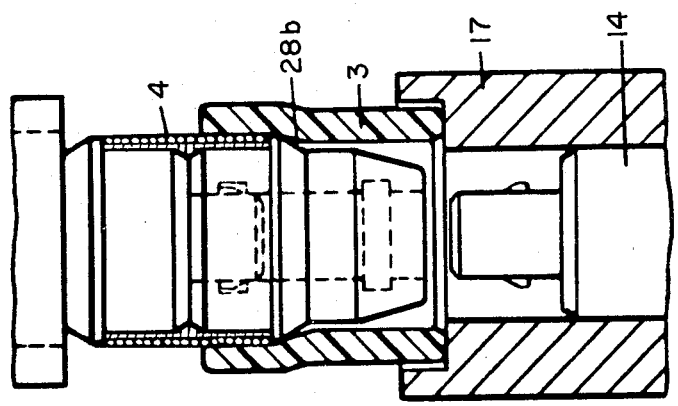

The completely wound and bonded compact coil 4 is plugged onto mandrel lower half 10b. For this purpose, the mandrel support 14 with the lower half 10b of the mandrel, and the pressure casing 17 are in a starting position (see FIG. 2). Subsequently, the mandrel support 14 moves upwards, whereby the coil 4 is pushed partly onto the upper half 10a of the mandrel (see FIG. 3). At the same time the two halves 10a and 10b of the mandrel are firmly interconnected in a centered position by means of the locking arrangement 13. After the resilient locking cams 13a have engaged groove 13b, the locking arrangement 16 between the lower half 10b of the mandrel and mandrel carrier 14 is released and the mandrel carrier is lowered into its lowest position. The heated tubular body 3, as illustrated in FIG. 3, is then placed into the centering step 18 of the pressure casing 17. As illustrated in FIG. 4, tubular body 3 is pushed upwards by means of pressure casing 17, whereby tubular body 3 is widened by the conical surface 28b and at the same time is pushed over the coil 4.

The ends 8 of the annular body 3, as illustrated in FIG. 5, project beyond the coil 4. In the pushed on terminal position, ends 8 are set free of the mandrel 10, because of the conical surfaces 28a and 28b, so that the still warm ends 8 contact immediately and then remain during the cooling-off time in cone-shaped diminished form.

At the same time, a firm connection develops between the coil 4 and the body 3 as a result of the partial contraction of body 3 about coil 4. The welding sleeve 1 remains in the position shown in FIG. 5, until the tubular body 3 has reached a temperature which is about 30° to about 80° C. below the temperature of the crystalline melting region or range of its thermoplastic material.

During this cooling-off time, the mandrel support 14 is moved upwards and is firmly connected by the locking arrangement 16 with the lower half 10b of the mandrel. In case of a simultaneous firm holding of the welding sleeve 1 by means of the jaws 23 of the holding mechanism 20, according to FIG. 6 (left half), the pressure casing 17, and after previous release of the locking arrangement 13, the mandrel support 14 and the lower half 10b of the mandrel are lowered. One end 8 is briefly widened since tubular body 3 is still warm, but collapses immediately again in the shape of a cone.

After opening of the holding mechanism 20, and after operating the wiping mechanism 19, according to FIG. 7, the finished welding sleeve 1 is stripped off the upper half 10a of the mandrel and drops for example into a container disposed below it.

As illustrated in the right half in FIG. 6 the supporting device 20 with jaws 23 can be omitted and the welding sleeve 1 can be held between casing 22 and pressure casing 17. In that case it is necessary, however, that the pressure casing 17 have separate, shiftable inner guide part 17' and can be slid over the lower half 10b of the mandrel.

During stripping, the other end 8 of the annular body is likewise widened, but then assumes again the conical form shown in FIGS. 1 and 7 as a result of its return capacity.

The apparatus described here may be developed for single part production for hand operation. For a serial production, the mandrel carrier 14, the pressure casing 17, the stripper arrangement 19, the holding arrangement 20 and the two locking mechanism 13 and 16 are provided with electric, pneumatic or hydraulic drives which are effectively connected with an automatic remote control. The insertion of coil 4 and of tubular body 3 can be accomplished simultaneously by robots to permit a fully automatic method of operation.

When the tubular body 3 is produced by an injection molding process, it can be removed at the described and required temperature from the injection mold and then placed directly, or after brief conditioning in a temperature controlled, intermediate magazine, into the apparatus, for example, by means of a robot. This saves power during manufacturing.

It is also possible to produce the tubular body from extruded pipes causing longitudinal orientation of the material during extrusion, and resulting in other prerequisites for widening and thus for frozen, radial contraction strains to be achieved in the tubular body.

The welding sleeve of the invention is suitable for connecting of pipes and for connecting molded parts, such as for example, fittings or armatures made of thermoplastic material and having a pipe-shaped connection.

For materials particularly susceptible to oxydation, the entire production process or parts thereof can take place under nitrogen, $CO_2$ of protective gas excess pressure. Also the finished sleeves may be put into weldable foil pouches immediately after production.

The welding sleeve is suitable for connection of all weldable thermoplastic materials such as for example, polyethylene, polypropylene etc. whereby their parts except for the resistance wire, are likewise made from the same materials.

While a certain advantageous embodiment has been chosen to illustrate the invention it will be understood by those skilled in the art that various changes and modifications can be made therein withou departing from the scope of the invention as defined in the appended claims.

What is claimed is:

1. A process for producing a welding sleeve, comprising the steps of:
    forming a helical coil having a resistance wire in a casing of thermoplastic material with adjacent windings thereof secured together;
    mounting the coil on a mandrel;
    heating a tubular body of thermoplastic material and pushing the body onto the mandrel to widen and stretch the body over the coil while the body is at a temperature between about 20° and about 40° C. below the temperature of the crystallite melting region of the body thermoplastic material such that ends of the body project axially beyond the coil;
    partially cooling and contracting the body about the coil, and shrinking each body end to a conical shape; and
    stripping the body off the mandrel with the coil secured on the inside surface thereof and with substantial residual radial contraction strains in the body.

2. A process according to claim 1, wherein the body is heated prior to being pushed onto the mandrel and is placed in a heated state into intermediate storage.

3. A process according to claim 1, wherein the tubular body is produced by an injection molding process and is pushed onto the mandrel immediately after the injection molding process by removing the body from an injection mold at the temperature required for the widening step.

4. A process according to claim 1, wherein the welding sleeve is stripped off the mandrel in a warm state at a temperature between about 30° and about 80° C. below the temperature of the crystallite melting region.

5. An apparatus for forming a welding sleeve having a tubular body of thermoplastic material with a helical coil of a resistance wire encased in thermoplastic material, comprising:

a mandrel having means for receiving a coil thereon and having a conical widening surface, said mandrel including first and second portions separable in a plane substantially transverse to its axial direction, said portions having opposed shoulders for axially retaining the coil and being releasably coupled by a first centering means and first locking means;

at least one pressure member disposed coaxially relative to said mandrel, said mandrel second portion being releasably coupled to said pressure member by a second centering means and a second locking means; and means for moving said pressure member in said axial direction toward and away from said mandrel.

6. An apparatus according to claim 5, wherein each said portion of said mandrel has a conical surface extending and tapering from the outside diameter of said shoulder thereof in a direction away from the other shoulder.

7. An apparatus according to claim 5, wherein a casing is disposed concentrically about said mandrel and is movable relative to said mandrel in said axial direction for stripping a finished welding sleeve from said mandrel.

8. An apparatus according to claim 5, wherein at least two holding jaws are disposed laterally of said mandrel and have means coupled thereto for moving said jaws in directions transverse to said axial direction.

9. An apparatus according to claim 5, wherein said pressure member has a centering step for receiving a tubular body.

10. An apparatus according to claim 5, further comprises means for automatically controlling the operation of the apparatus.

11. An apparatus according to claim 5, further comprises a temperature-regulated intermediate magazine means for conditioning tubular bodies prior to processing.

* * * * *